United States Patent [19]

Michael et al.

[11] 3,901,789
[45] Aug. 26, 1975

[54] SOLVENT DEWAXING WITH OXIDIZED HIGH MOLECULAR WEIGHT ALPHA OLEFIN WAX AIDS

[75] Inventors: Arthur Leroy Michael, Chicora; John Joseph Kaufman, Parker, both of Pa.

[73] Assignee: Witco Chemical Corporation, New York, N.Y.

[22] Filed: Aug. 20, 1973

[21] Appl. No.: 389,928

[52] U.S. Cl. ................. 208/33; 208/3; 260/451
[51] Int. Cl. ................ C10g 43/06; C10g 43/08
[58] Field of Search .......... 208/31, 33, 3; 44/62, 80; 260/451

[56] References Cited
UNITED STATES PATENTS

| | | | |
|---|---|---|---|
| 3,224,956 | 12/1965 | Phillips et al. | 208/31 |
| 3,329,602 | 7/1967 | Moyer | 208/33 |

*Primary Examiner*—Herbert Levine
*Attorney, Agent, or Firm*—Albert L. Gazzola; Jordan J. Driks; Morton Friedman

[57] ABSTRACT

Oxidation of a high molecular weight unsaturated waxes having substantial alphaolefin content yield products having excellent deoiling and/or dewaxing properties.

2 Claims, No Drawings

| 3,901,789 |

SOLVENT DEWAXING WITH OXIDIZED HIGH MOLECULAR WEIGHT ALPHA OLEFIN WAX AIDS

The present invention relates to novel oxidized high molecular weight alpha olefin waxes particularly useful in the separation of wax from oil.

It is well known that separation of wax from a mineral oil and vice-versa is best accomplished with a catalytic amount of oxidized wax. An improved process for separating a hydrocarbon oil from wax, for instance, is described in U.S. Pat. No. 3,224,956, issued to Phillips et al. on Dec. 21, 1965, which is incorporated herein by reference, wherein oxidized microcrystalline waxes are disclosed which give good results when used as catalysts in the separation of wax from oil. There is no art known to applicants dealing with the use of the novel oxidized high molecular weight alpha-olefin wax as herein described and claimed.

According to the present invention, an alpha olefin wax of high molecular weight, i.e. comprised of from about 28-48 carbon atoms and mixtures thereof, when oxidized as described in the patent to Phillips supra, for instance, yields a product which is derived from readily available feedstock, is more economical and at least as good as oxidized microcrystalline wax when employed as a separation aid in the separation of waxes from oils.

The high molecular weight alpha-olefin wax used in the present concept need not be highly purified. Indeed, even a very crude alpha olefin, comprised of a mixture of substantially $C_{28}$–$C_{48}$ hydrocarbons, having as little as about 40–50% alpha olefin unsaturation, or even less, is effective and because of the lower cost of these raw materials, they are preferred.

A readily available source of unsaturated high molecular weight waxes of high alpha-olefin content is derived from the polymerization of ethylene using Ziegler catalyst, to produce an homologeous series of even numbered, normal alpha olefins, in the $C_4$ to $C_{20}$ range, and in the $C_{22}$ to $C_{28}$ range, wherein a quantity of about 5–10% of a high molecular weight unsaturated wax having a high alpha olefin content is also produced, which, because of branching and internal double bond occurrence, and because of the presence of about 10–15% saturates, is normally rejected. This readily available alpha olefin wax fraction, having about 50%, or more, alpha olefin content, and comprised of predominately $C_{28}$–$C_{48}$ carbon fractions, having some internal double bonds and containing some saturated hydrocarbons, suprisingly, when oxidized as herein described, constitutes an excellent separation aid for the separation of wax from oil.

The separation of wax from oil by the known process of dissolving the wax-oil mixture in an organic solvent and cooling to a temperature at which the wax solidifies, then separating the solid wax from the liquid phase, using an amount of oxidized wax, such as a microcrystalline wax as disclosed in the above cited patent, as stated hereinbefore, is now more economical in the utilization of an oxidized high molecular weight alpha olefin wax, as herein described and claimed.

The present $C_{28}$–$C_{48}$ oxidized alpha olefin waxes are novel, and useful, in the separation of wax from oil, as stated above, and they may also be employed wherever oxidized waxes are known to be useful for instance, as emulsifiers, in wax floor polishes, in carbon paper coatings, and the like, as known in the art.

According to the present invention, the high molecular weight alpha olefin wax, is oxidized to yield a harder wax having a melting point (ASTM D-127) of between 140° and 180°F., a penetration number (ASTM D-1321) at 77°F. of between about 2 and 10, depending on the degree of oxidation, and a Saybolt viscosity (ASTM D-88) at 210°F., of over about 400 and up to 20,000 S.U.S., or even higher.

The oxidized alpha olefin wax of the present invention, is prepared as known by the artisan, by treating the wax with air, oxygen containing gas, pure oxygen, or oxygen containing ozone, under specific conditions. The oxidation is preferably catalytic and as a catalyst there may be used a metal oxidation catalyst such as manganese naphthenate, cobalt naphthenate, potassium permanganate, manganese dioxide, manganese stearate, cobalt stearate, manganese oleate, cobalt oleate, and the like. The preferred catalysts include manganese naphthenate or cobalt naphthenate containing about 6% manganese or cobalt metal respectively, in a 57% solution of mineral spirits. Solid manganese naphthenate and cobalt naphthenate, however, are also effective. These catalysts, as known in the art, are used generally in the concentration of about 0.5 to 3.0% of metal, based on the weight of the wax. The oxidation is effected, as known in the art, by passing the air or oxygen containing gas through the agitated hot wax-catalyst mixture i.e. a temperature of at least about 250°F. and preferably at least 280°F., as known in the art. It is not generally feasible, however, to operate at temperatures above 360°F.

The rate of gas flowing through the melted wax is generally about 1–2 standard cubic foot per minute for about 250 lbs. of wax, as known in the art. This same air flow is usually effective for as little as 20 lbs. to as much as 1,000 lbs. of wax, depending on the weight of the particular wax to be oxidized and available equipment.

It is preferred to conduct the oxidation at atmospheric pressure, but the oxidation is also effective under elevated pressures of between about 20 and 45 lbs./sq. in. Absolute, for instance. At atmospheric pressure, and at 285°F., the oxidation, for the desired oxidized wax, when feeding air at the rate of about 0.5–3.0 cu. ft./min. usually takes from about 25 to 120 hours and generally between 70–80 hours, as described in the above cited patent and shown in the appended examples and tables.

It is also possible, as known in the art, to oxidize the alpha olefin wax without the use of a catalyst, by blowing air through the wax at a temperature of 240°–250°F. at a rate of about 1 standard cubic foot per 90 lbs. of wax per minute. This is continued until the wax has developed an acid number of about 25–30, a corresponding saponification number of 65–75, and saybolt viscosity at 210°C. of over 400 S.U.S. This process is well known in the art and generally needs no further clarification herein.

Novel unsaturated, high molecular weight oxidized wax having an acid number of 15 to 40, a saponification number of about 50 to 150 and a Saybolt viscosity at 210°F. of over 400 Saybolt Universal Seconds, as stated above, are made available by the present invention.

The oxidized high molecular alpha-olefin wax products may be neutralized using an alkali such as sodium carbonate or bicarbonate, hydroxide, and the like. It is generally known that a neutralized oxidized wax is preferred when the separation of wax from oil in the wax-oil mixture is to be effected by filtration, but not when by centrifuging.

In doiling and/or dewaxing, a small amount of the oxidized high molecular weight alpha olefin wax product may be directly incorporated into the material being separated, or into the solvent used for deoiling or dewaxing, or may be first dissolved in an oil as for example neutral oils, semi-treated or finished mineral oils, and the like, as known in the art.

Solvents which may be used for dewaxing or deoiling operation as known in the art, include any of the conventional well known solvents as for example naphtha, benzol, methyl ethyl ketone, naphtha-methyl ethyl ketone, ethylene dichloride, and the like, and mixtures thereof.

In the deoiling of wax, a drier and harder wax is obtained in high yield, and the dewaxing of oil produces a high yield of oil with a lower concentration of wax and thus a low pour point.

The tables and description which follow, are illustrative of the present invention, and are not intended to be limiting thereto.

An alpha-olefin wax comprised of a mixture of hydrocarbons with chain lengths of $C_{28}$ to $C_{48}$, is catalytically oxidized under varying conditions of time, temperature, and oxygen flow rate, to produce a series of hard, light colored oxidized hydrocarbon products. Physical properties of the resultant oxidized alphaolefin products are summarized in Table I below:

hydrotreated is dewaxed without a dewaxing aid. An identical sample is dewaxed with 0.5% of the product produced in Examples 1 and another with the product of Example 7. In each experiment, a 40% concentration of crude petrolatum in naphtha solution at +40°F. end temperature is dewaxed. The results obtained are listed below.

TABLE II

|  | Dewaxing of Crude Petrolatum Wax | | | Oil Reject | |
|---|---|---|---|---|---|
| Crude Petrolatum | Yield Wt. % | Congealing Pt., °F. (D-938) | Penetration/77°F. (D-1321) | Yield Wt. % | Pour Point, °F. (D-97) |
| 100% | 61.0 | 159 | 100 | 37.0 | +95/100 |
| 99.5% + 0.5% of Example 1 | 46.0 | 164 | 38 | 53.6 | +85/90 |
| 99.5% + 0.5% of Example 7 | 42.1 | 163 | 28 | 57.8 | +80/85 |
| 99.5% + 0.5% of Oxidized Microwax* | 41.8 | 163 | 28 | 57.9 | +80/85 |

*U.S.P. 3,224,956

Similar results are obtained with other oxidized high molecular weight waxes described in the above table.

The above results compare with the catalytic effect of oxidized microcrystalline wax as described in U.S. Pat. No. 3,224,956, incorporated herein by reference, in promoting the separation of wax from oil.

The embodiments of the invention in which an exclusive property or privilege is claimed are defined as follows:

1. In the separation of wax from oil wherein a wax-oil mixture is dissolved in an organic solvent and cooled to a temperature at which the wax solidifies, the improvement of conducting the separation in the presence of a small amount of an oxidized high molecular weight alpha-olefin wax derived from a Ziegler type wax having from about 28–48 carbons, and mixtures thereof, said oxidized alpha-olefin wax having a melting point (ASTM D-127), in the range of about 140°–180°F. a penetration number at 77°F. of between 2–10 and a Saybolt viscosity at 210°F. of more than about 400 S.U.S.

2. In the separation of wax from oil as in claim 1, wherein the oxidized alpha-olefin wax comprises a mixture derived from a Ziegler type wax having substan-

TABLE I

| Property | ASTM Test Method | Catalytic Oxidation of High Molecular Weight Alpha Olefin Waxes | | | | | | | |
|---|---|---|---|---|---|---|---|---|---|
| | | Alpha Olefin $C_{28+}$ | Example 1 | 2 | 3 | 4 | 5 | 6 | 7 |
| Melting Point | | | | | | | | | |
| Congealing, °F. | D-938 | 166 | 158 | 149 | 148 | 142 | 153 | 152 | 149 |
| Drop, °F. | D-127 | 174.2 | — | — | 165.0 | — | — | — | 169.9 |
| Penetration, 77°F., dmm | D-1321 | 12 | 3 | 4 | 4 | 7 | 3 | 3 | 8 |
| Acid No. | D-974 | Nil | 16 | 16 | 19 | 35 | 19 | 22 | 28 |
| Saponification No. | D-94 | Nil | 67 | 68 | 61 | 143 | 84 | 85 | 87.9 |
| Vis., SUS/210°F. | D-88 | 66 | 14,000 | 15,000 | 16,000 | 4,000 | 8,000 | 4,000 | 423 |
| Color | D-1500 | L 0.5 | L 5.5 | L 7.5 | L 4.0 | L 2.5 | L 6.0 | L 4.5 | L 2.0 |
| Oxidation Conditions | | | | | | | | | |
| Temperature, °F. | | | 285 | 285 | 285 | 285 | 250 | 250 | 225 |
| Air Rate* | | | L | M | M | M | M | M | H |
| Manganese (6% Mn Naphthenate Soln.) | | | 1% | 1% | 1% | 1% | 1% | 1% | 1% |
| Time in Hours | | | 46 | 54 | 75 | 85 | 103 | 114 | 29 |

*Low = 0.4 cu. ft./min.; Medium = 1-1.2 cu. ft./min.; High = 3.3 cu. ft./min.

A long residuum of Gulf Coast Crude Oil, normally termed a crude petrolatum which may or may not be tially $C_{28}$–$C_{48}$ unsaturated hydrocarbons.

* * * * *